R. F. OSBORN & J. ROACH.
ARTIFICIAL STONEWARE.
APPLICATION FILED JULY 1, 1910.
1,075,932.
Patented Oct. 14, 1913.
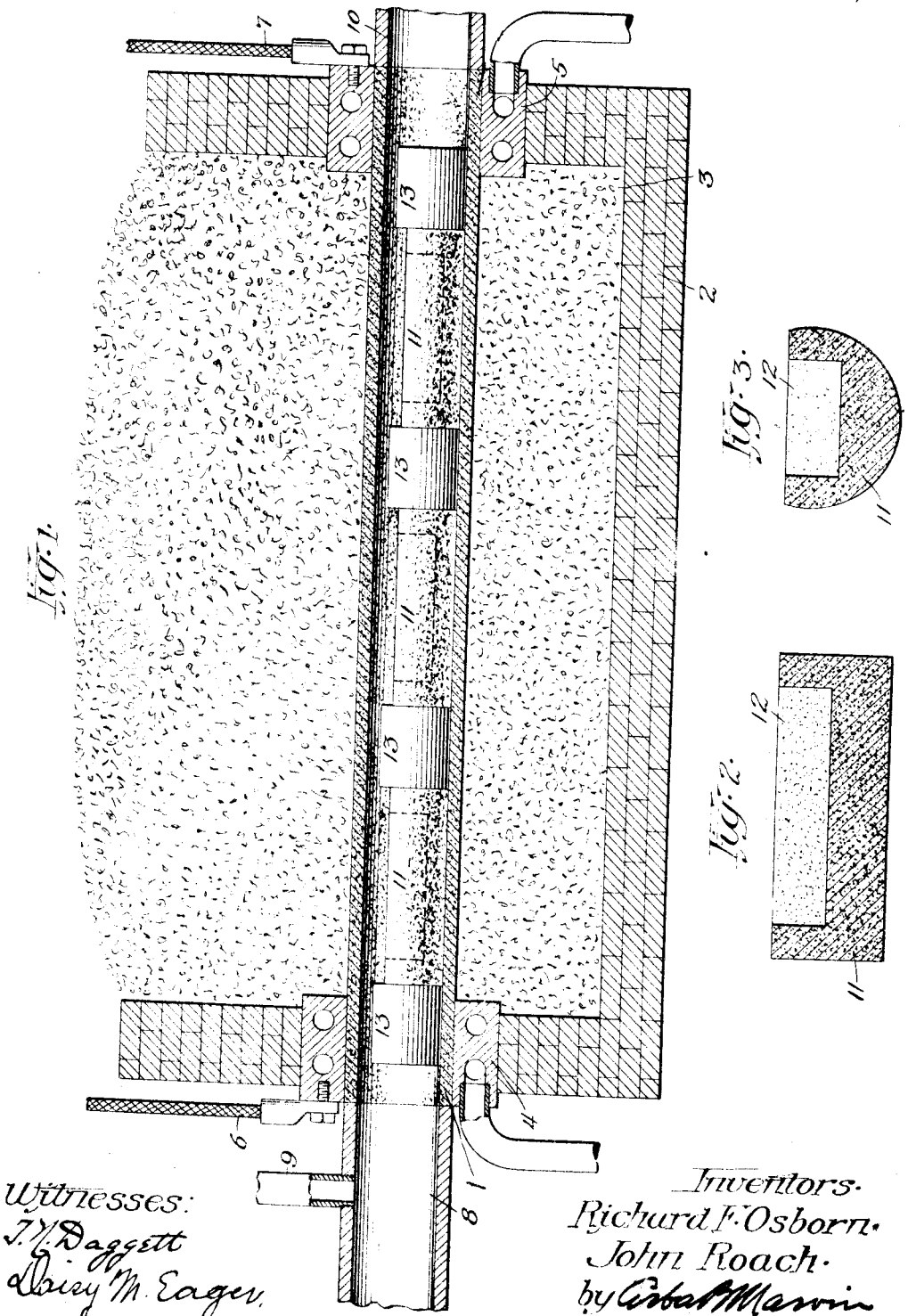
Witnesses:
J. N. Daggett
Daisy M. Eager
Inventors.
Richard F. Osborn.
John Roach.
by Arbab Marvin
Attorney.

UNITED STATES PATENT OFFICE.

RICHARD F. OSBORN AND JOHN ROACH, OF AINSWORTH, NEBRASKA, ASSIGNORS OF ONE-THIRD TO ALBERT A. RADTKE, OF CHICAGO, ILLINOIS.

ARTIFICIAL STONEWARE.

1,075,932.   Specification of Letters Patent.   Patented Oct. 14, 1913.

Original application filed May 7, 1910, Serial No. 559,943. Divided and this application filed July 1, 1910. Serial No. 569,832.

*To all whom it may concern:*

Be it known that we, RICHARD F. OSBORN and JOHN ROACH, citizens of the United States, both residing at Ainsworth, county of Brown, State of Nebraska, have invented certain new and useful Improvements in Artificial Stoneware, of which the following is a specification.

The present application is a division of our application Ser. No. 559,943, filed May 7, 1910.

In Brown county, Nebraska, and in other places, there may be found large deposits of a dry, gritty sand, having a chemical composition approximately as follows: Silica 93.74%, oxids of iron 2.13%, oxid of alumina 1.3%, calcium oxid .56%, sulfate of lime, trace, magnesium oxid 1.03%, combined moisture .72%, undetermined .52%.

The main object of the present invention is to produce from this sand, and from sands of a similar composition, an artificial stoneware, very porous in its structure, but strong and coherent.

The material embraced by the present invention is very refractory in character, and has low heat conductivity, and may be used for building purposes, as in the form of brick, building blocks, and the like, or it can be made in the shape of drainage tile and filter blocks, wherein its great porosity is of advantage in allowing the ready passage of water.

In the process herein described, the sand is made into coherent bodies without the use of moisture or the aid of pressure, and without the addition of any binding agent or any fluxing medium.

An apparatus wherein the process may be effected is shown in the accompanying drawings, in which—

Figure 1 is a sectional elevation of an electrical furnace of the resistance tube type. In this furnace, the necessary heat treatment of the sand may be carried out. Fig. 2 is a longitudinal section of a mold in which the sand may be supported during its passage through the furnace. Fig. 3 is a transverse section of the mold shown in Fig. 2.

The furnace shown in the drawing comprises a carbon resistance tube 1, mounted in a brickwork 2, and covered by a refractory packing 3 of magnesia or other heat insulating material. The carbon tube is provided at its ends with water-cooled copper terminals 4 and 5 of ordinary type, to which current of suitable quantity and voltage may be delivered through conductors 6 and 7. At the inlet end of the resistance tube is an iron chamber 8, serving to exclude air from the tube, and affording a means for conveying the objects to be heated into the carbon tube. This chamber 8 may have a tubular inlet 9, through which an inert gas may be supplied to the carbon tube to lessen the danger of chemical action therein. At the other end of the carbon tube is an iron chamber 10, into which the heated objects may be expelled after their treatment has been completed. Through this heated carbon tube may be passed a series of refractory boats or molds containing sand to be subjected to the sintering action of the heat maintained by the tube. The exact shape of these molds will depend on the shape of the product to be produced, but for producing rectangular bricks, the molds may be of the kind shown in Figs. 2 and 3. These molds are of carbon with a rounded bottom to fit the general contour of the heating tube, and with a rectangular recess 12, open at the top, and serving as a receptacle for the dry sand. Spacing blocks 13 of lavite or other inert refractory material, may be used to separate one carbon mold from another.

The operation of the apparatus is as follows: Dry sand, of about the composition above indicated, is introduced into the carbon molds, and these molds are pushed into the furnace, one after another, with insulating blocks between, and are there subjected to a heat high enough to sinter the particles of sand into a coherent body having the general shape of the mold. The temperature should not, however, be sufficient to fuse the sand, or to cause any appreciable flow. The molds, with their contents, are ultimately pushed through into the outlet chamber 10, from which they may be removed.

The electric tube furnace, when used as a heating means, offers the advantage that the temperature can be closely regulated, and the further advantage that the heating of the sand and its mold goes on in an inert environment, thereby obviating the danger of oxidizing the molds.

Artificial stoneware produced as herein described is about like firebrick in its power to resist heat, but is much more porous than firebrick. Because of this porosity, it has a much lower heat conductivity. Also, its porous structure gives to it a certain toughness and power to resist shock and localized pressure. Under a magnifying glass, this artificial stoneware seems to consist of the original sand particles merely joined together at their points of contact, leaving the original interstices altogether open. It is this highly porous character of the material which renders it serviceable for use as filter blocks, and as drainage tile and the like.

What we claim as new, and desire to secure by Letters Patent of the United States is:

1. An artificial material of great porosity which is vitreous and anhydrous and otherwise adapted for use in the construction of drainage tile, said material being uniform and coherent in its physical structure and consisting solely of coarse native sand particles sintered together at their points of contact one with another and free from extraneous fluxing material, the original interstices of the body of sand remaining open to form sinuous water channels giving to the structure porosity and toughness, said material comprising about 93 per cent. anhydrous silica.

2. Artificial building blocks which consist entirely of native coarse sand particles sintered together at their points of contact one with another to form a coherent structure, the original interstices of the body of sand remaining open to form sinuous channels and giving porosity to the structure, said material comprising about 93 per cent. anhydrous silica and being free from extraneous binders or fluxers.

In witness whereof, we have hereunto set our hands this 25th day of June, A. D. 1910.

RICHARD F. OSBORN.
JOHN ROACH.

Witnesses:
WM. SOUTHWELL,
HILDEBERT SOUTHWELL.